US011518694B2

(12) United States Patent
Price

(10) Patent No.: US 11,518,694 B2
(45) Date of Patent: Dec. 6, 2022

(54) METHODS OF INHIBITING CYANOBACTERIA USING CITRON

(71) Applicant: Maxwell Zachary Price, Suffern, NY (US)

(72) Inventor: Maxwell Zachary Price, Suffern, NY (US)

(*) Notice: Subject to any disclaimer, the term of this patent is extended or adjusted under 35 U.S.C. 154(b) by 30 days.

(21) Appl. No.: 17/247,628

(22) Filed: Dec. 18, 2020

(65) Prior Publication Data
US 2021/0340035 A1 Nov. 4, 2021

Related U.S. Application Data

(60) Provisional application No. 62/950,006, filed on Dec. 18, 2019.

(51) Int. Cl.
*C02F 1/50* (2006.01)
*C02F 103/00* (2006.01)

(52) U.S. Cl.
CPC .......... *C02F 1/50* (2013.01); *C02F 2103/007* (2013.01)

(58) Field of Classification Search
USPC ........................................ 210/764
See application file for complete search history.

(56) References Cited

U.S. PATENT DOCUMENTS

2002/0153301 A1* 10/2002 Jensen ............... C02F 3/327 210/602
2015/0305330 A1* 10/2015 Alper .................. A01N 61/00 424/78.18
2017/0341942 A1* 11/2017 Harper, Jr. ........... C12M 43/06
2019/0191704 A1* 6/2019 Albright .................. C11D 1/94
2019/0281819 A1* 9/2019 Hernandez ............ A01N 37/44
2021/0186028 A1* 6/2021 Jin ........................ A61K 45/06

FOREIGN PATENT DOCUMENTS

GB 2158060 A * 11/1985 ................ C02F 1/50

OTHER PUBLICATIONS

"Antimicrobial activity of metal based nanoparticles against microbes associated with disease in aquaculture", Swain et al., Springer Science Business Media Dordrecht (2014), Word J. Microbiol Biotechnolgo (2014) 30:2491-2502 (Year: 2014).*
Paerl, H., Otten, T. 2012. Harmful Cyanobacterial Blooms: Causes, Consequences, and Controls. Environ. Microbiol.
Yoshida-Takashima, Y., Yoshida, M., Ogata, H., Nagasaki, K., Hiroishi, S., Yoshida, T. 2012. Cyanophage Infection in the Bloom-Forming Cyanobacteria Microcystis aeruginosa in Surface Freshwater. Microbes Environ. 27:4, 350-355.
Governor Cuomo Announces Action Plans to Combat Harmful Algal Blooms. (Jun. 20, 2018). Retrieved from https://www.governor.ny.gov/news/governor-cuomo-announces-action-plans-combat-harmful-algal-blooms.

(Continued)

*Primary Examiner* — Nina Bhat
(74) *Attorney, Agent, or Firm* — David B. Gornish; Eckert Seamans Cherin & Mellott, LLC

(57) ABSTRACT

Methods are provided for inhibiting cyanobacteria. The methods include treating a substance contaminated with cyanobacteria with a composition. The composition includes *Citrus medica* Linn. or an extract of the same.

16 Claims, 3 Drawing Sheets

(56) References Cited

OTHER PUBLICATIONS

Sigee, D.C., Glenn, R., Andrews, M.J., Bellinger, E.G., Butler, R.D., Epton, H.A.S., Hendry, R.D. 1999. Biological Control of Cyanobacteria: Principlesand Possibilities. Hydrobiologia 395/396, 161-172.
Sah, A.N., Juyal, V., Melkani, A.B. 2011. Antimicrobial Activity of Six Different Parts of the Plant Citrus medica Linn. J. PHCOG. 3:21, 80-83.
Li, Z., Cai, M., Liu, Y., Sun, P., Luo, S. 2019. Antibacterial Activity and Mechanisms of Essential Oil from Citrus medica L. var. *Sarcodactylis*. Molecules. 8:1577.
Hoiczyk, E., Hansel, A. 2000. Cyanobacterial Cell Walls: News from an Unusual Prokaryotic Envelope. J. Bacteriology. 182:5, 1191-1199.
Wang, X, et al., Effect of the pH values on growth of Microcystis aeruginosa, 2011 Second International Conference on Mechanic Automation and Control Engineering, Aug. 18, 2011.

\* cited by examiner

METHODS OF INHIBITING CYANOBACTERIA USING CITRON

CROSS-REFERENCE TO RELATED APPLICATIONS

This application claims priority to U.S. Provisional Patent Application No. 62/950,006, entitled "Methods of Inhibiting Cyanobacteria Using Citron," filed on Dec. 18, 2019, which is incorporated by reference herein in its entirety.

BACKGROUND OF THE INVENTION

1. Field of Invention

The disclosed concept relates generally to compositions capable of inhibiting growth and proliferation of cyanobacteria. More particularly, the disclosed concept relates to use of *Citrus medico* Linn. (citron) or extracts thereof to inhibit growth of and/or kill cyanobacteria. The disclosed concept may be useful, for example, to control growth of cyanobacteria in freshwater lakes.

2. Description of Related Art

Cyanobacteria are the oldest oxygenic photoautotrophs on earth. They possess great capacity to adapt to nutrient over-enrichment with nitrogen and phosphorus (eutrophication) and rising water temperatures due to climate change. Consequently, bloom-forming taxa, such as *microcystis aeruginosa*, have been proliferating in freshwater lakes throughout the world, including New York State, producing "microcystins," which are hepatotoxins that can cause death of wildlife and hepatocellular carcinoma in humans. This has become an urgent problem for which no viable solution has, until now, been proposed. Given the urgency of the unmet need to address the problem, the current governor of New York has allocated $60 million to research solutions to combat harmful algal blooms (HAB).

Although algicides could potentially be an effective method of control, they are expensive and damaging to the surrounding environment. While biological control agents, such as bacteriophages, or actinomycetes, are capable of lysing cyanobacterial cell walls, applying sufficient amounts required to effectively address the issue is not feasible.

All parts of the citron fruit, *Citrus medico* Linn., have been shown to be effective against both gram positive and gram negative bacteria, and fungi, by inducing cell wall lysis and disrupting the cell membrane, causing intracellular leakage without causing toxicity to human cells or the environment. In particular, the citron juice's three most abundant components in decreasing amounts are: limonene, y-terpinene, and dodecanoic acid, which together act synergistically to effect bacterial cell death within hours. However, in contrast to the more vulnerable cell walls of these bacteria, the cyanobacterial cell wall is distinct from that of gram negative bacteria and bears even less similarity to the cell wall of gram positive bacteria, which appears to have led researchers away from ever testing the citron on cyanobacteria prior to Applicant's discovery of the disclosed concept.

SUMMARY OF THE INVENTION

Accordingly, in one optional embodiment, a method of inhibiting cyanobacteria is provided. The method includes treating a cyanobacteria contaminated substance with an effective amount of a composition comprising *Citrus medica* Linn. or an extract thereof. While not being bound to this theory, Applicant contemplates that the limonene, y-terpinene, and dodecanoic acid that are in the *Citrus medica* Linn. act together to inhibit cyanobacteria. Thus, one optional embodiment of the disclosed concept is a method of treating a cyanobacteria contaminated substance with an effective amount of a composition that includes limonene, y-terpinene, and dodecanoic acid (whether those compounds are sourced from *Citrus medica* Linn. or otherwise). Optionally, the method includes treating a body of freshwater (e.g., lake), that is contaminated with cyanobacteria, with the aforementioned compositions. Optionally, in any embodiment, the composition further includes a buffer. Optionally, in any embodiment, the composition is provided as a dry powder or in an aqueous solution.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee. The invention will be described in conjunction with the following drawings in which like reference numerals designate like elements and wherein.

DETAILED DESCRIPTION OF PREFERRED EMBODIMENTS OF THE INVENTION

Figure 1:
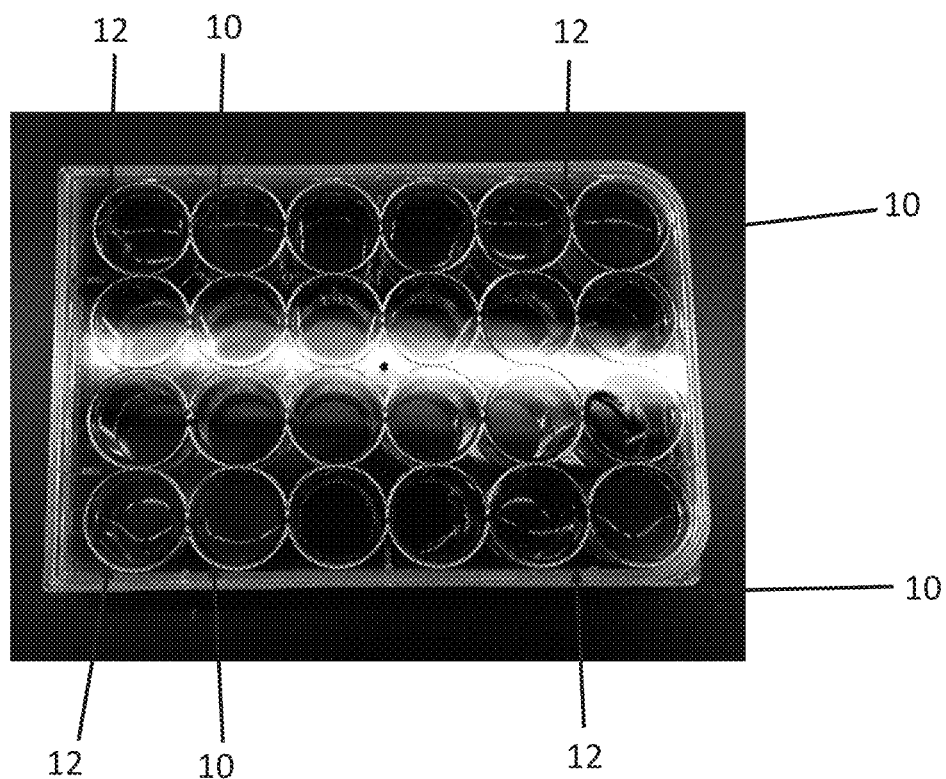
FIG. 1 is a photograph of wells representative of the condition of the contaminated water of the experimental and control groups from days 1 to 5.
Figure 2:
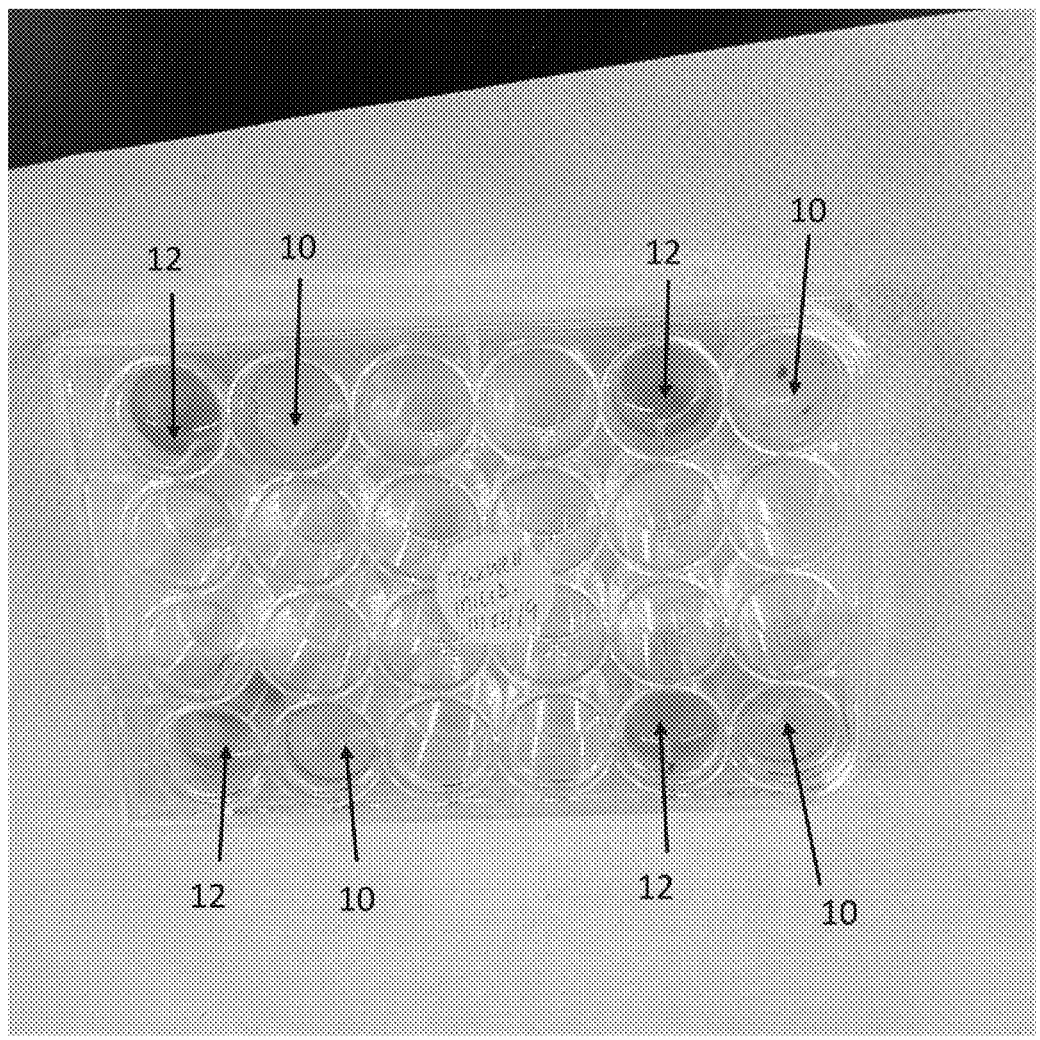
FIG. 2 is a photograph of the condition of the contaminated water of the experimental and control groups on day twelve.
Figure 3:
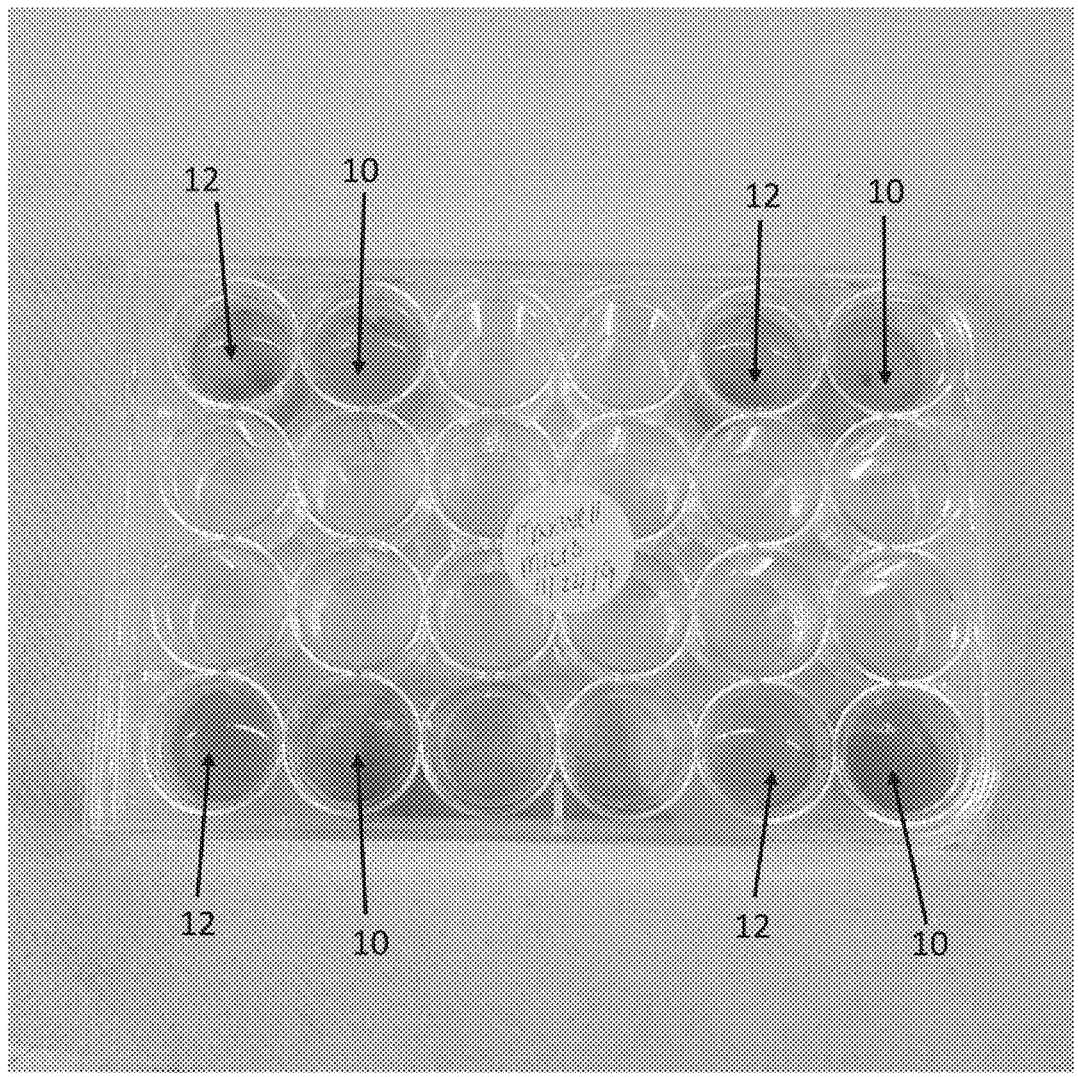
FIG. 3 is a photograph of the condition of the contaminated water of the experimental and control groups on day fourteen.

As used herein, the term "inhibit" refers to the ability of *Citrus medica* Linn. or an extract thereof to inactivate cyanobacteria, kill cyanobacteria and/or hinder the ability of cyanobacteria in its capacity to grow and/or proliferate.

In an optional aspect, the disclosed concept comprises treating a body of freshwater (such as a lake) that is contaminated with cyanobacteria, using an effective amount of a composition comprising *Citrus medica* Linn. or an extract thereof. Prior to conducting the experiments described below, Applicant had hypothesized that the citron, and its juice in particular, may inhibit cyanobacterial growth, and specifically *M. aeruginosa*. This idea was based upon many years of empirical observation, in which it was noted that the citron (referred to in Hebrew as the "etrog"), used in the ancient, annual Jewish ritual of Sukkoth (the "Feast of Tabernacles") neither rots, nor becomes malodorous, nor grows mold, fungus, or bacteria. Notwithstanding the reasons set forth in the Background of the Invention, above, as to why researchers were led away from using the citron for this purpose, Applicant sought to test this hypothesis. To Applicant's knowledge, this disclosure is the first report of the citron surprisingly demonstrating bactericidal effects on cyanobacteria, even in the presence of a buffer to reduce the potential effects of its acidity.

EXAMPLES

The disclosed concepts will be illustrated in more detail with reference to the following Examples, but it should be understood that the disclosed concepts are not deemed to be limited thereto.

Example 1

Controlled Experiment Demonstrating Efficacy of the Citron in Killing Cyanobacteria Vials were filled with water from New York State lakes and ponds at surface level and cultures were grown in a lab. Pipets were used to transfer 0.8 mL of *M. aeruginosa* and 1.25 mL of BG-11 Growth Media into four 3.4 mL well cell wall clusters as the control groups. Four experimental groups contained the same volumes of *M. aeruginosa* and Growth Media plus 0.25 mL of fruit juice squeezed from *Citrus medico* Linn., stored at 4° C. Prior to adding the organism, bicarbonate was titrated for each group to reach a pH of 8.0 to be within the range of viability (4.7-12.0) for the organism. After 2 weeks of exposure to light in an incubator, the antimicrobial activity was evaluated by comparing the clarity of the four wells containing the *M. aeruginosa* plus *Citrus medico* Linn. to the four control groups.

FIG. 1 is a photograph of wells representative of the condition of the water of the experimental and control groups from days 1 to 5. FIG. 2 is a photograph of the condition of the water of the experimental and control groups on day twelve. FIG. 3 is a photograph of the condition of the water of the experimental and control groups on day fourteen. Experimental wells 10 are designated in the photograph as are control wells 12. The experimental wells 10 include the contaminated water treated with the *Citrus medica* Linn. as described above while the control wells contained the contaminated water that was not so treated, as described above. As shown in FIG. 1, the control and experimental wells were still clear and virtually indistinguishable visually. FIG. 2 shows that by the twelfth day, the control wells 12 turned green, indicating cell growth, while experimental wells 10 turned brown, indicating cell death. These shades of green and brown are even more pronounced on day fourteen, as shown in FIG. 3.

To Applicant's knowledge, this is the first ever study to demonstrate growth inhibition of cyanobacteria by *Citrus medico* Linn. Specifically, the juice of the fruit inhibited growth of *Microcystis aeruginosa.* These results are significant because this organism is pathogenic to humans and readily found in bodies of water throughout the world. There is a dire unmet need to reduce harmful cyanobacteria without causing toxicity to the environment. Numerous other efforts to reduce cyanobacteria have failed to achieve this goal. This discovery holds the potential to solve this problem. Optionally, the essential components found in *Citrus medico* Linn. may be isolated to formulate a blended powder that can be scaled up, commercialized, and spread innocuously into environments where cyanobacteria reside and cause harm.

While the invention has been described in detail and with reference to specific examples thereof, it will be apparent to one skilled in the art that various changes and modifications can be made therein without departing from the spirit and scope thereof.

What is claimed is:

1. A method of inhibiting cyanobacteria, the method comprising treating a cyanobacteria contaminated volume of liquid with an effective amount of a composition comprising Citrus medica Linn. or an extract thereof, wherein the volume of liquid is about 3 mL and the effective amount of composition is at least about 0.25 mL.

2. The method of claim 1, wherein the composition further comprises a buffer.

3. The method of claim 2, wherein the composition is in dry powder form.

4. The method of claim 2, wherein the composition is in the form of an aqueous solution.

5. The method of claim 1, wherein the substancovolume of liquid is a portion of a body of freshwater.

6. The method of claim 5, wherein the body of freshwater is a lake or a pond.

7. A method of inhibiting cyanobacteria, the method comprising treating a cyanobacteria contaminated with an effective amount of a composition comprising limonene, y-terpinene, and dodecanoic acid, wherein the volume of liquid is about 3 mL and the effective amount of composition is at least about 0.25 mL.

8. The method of claim 7, wherein the composition further comprises a buffer.

9. The method of claim 8, wherein the composition is in dry powder form.

10. The method of claim 8, wherein the composition is in the form of an aqueous solution.

11. The method of claim 7, wherein the substance is a portion of a body of freshwater.

12. The method of claim 11, wherein the body of freshwater is a lake or a pond.

13. A method of inhibiting cyanobacteria, the method comprising treating a cyanobacteria contaminated volume of liquid with an effective amount of a composition comprising Citrus medica Linn. or an extract thereof, wherein the effective amount of the composition is provided at a ratio of 12 parts volume of liquid to at least 1 part composition.

14. The method of claim 13, wherein the volume of liquid is a portion of a body of freshwater.

15. A method of inhibiting cyanobacteria, the method comprising treating a cyanobacteria contaminated 3 mL volume of liquid with a composition comprising limonene, y-terpinene, and dodecanoic acid, wherein the limonene, y-terpinene, and dodecanoic acid of the composition are cumulatively present in at least an equivalent amount that limonene, y-terpinene, and dodecanoic acid are cumulatively present in 0.25 mL of juice from Citrus medica Linn.

16. The method of claim 15, wherein the 3 mL volume of liquid is a portion of a body of freshwater.

* * * * *